UNITED STATES PATENT OFFICE.

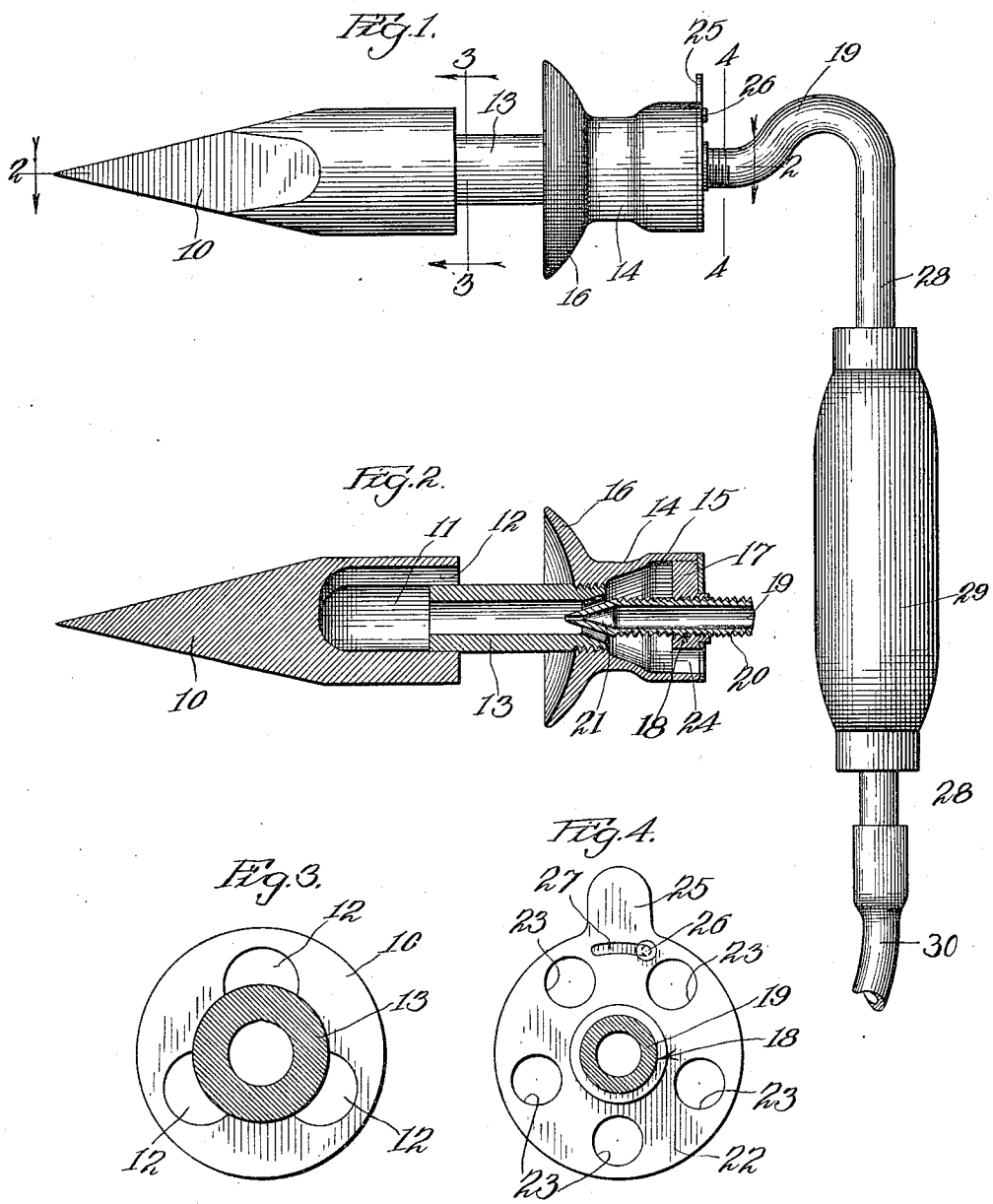

JOHN SWIERGOCKI, OF CHICAGO, ILLINOIS.

SOLDERING-IRON.

1,153,971.  Specification of Letters Patent.  Patented Sept. 21, 1915.

Application filed August 21, 1914. Serial No. 857,832.

*To all whom it may concern:*

Be it known that I, JOHN SWIERGOCKI, a citizen of the United States, residing at Chicago, in the county of Cook and State of Illinois, have invented certain new and useful Improvements in Soldering-Irons, of which the following is a full, clear, and exact specification.

This invention relates to soldering irons and has for its object a construction which includes an adjustment whereby the intensity and strength of the flame and resulting heat may be regulated.

With the above and other objects in view this invention consists in the construction, combination and arrangement of parts all as hereinafter more fully described claimed and illustrated in the accompanying drawings wherein:

Figure 1 is a side elevation of an iron constructed in accordance with the present invention, illustrating a substitute handle in dotted lines. Fig. 2 is a longitudinal section along line 2—2 of Fig. 1 to illustrate the arrangement of the iron tip in connection with the fuel and air feeds. Fig. 3 is a vertical section along line 3—3 of Fig. 1 and constitutes an elevation of the inner end of the soldering tip or point, the feed pipe being in section. Fig. 4 is a similar view along line 4—4 of Fig. 1 to illustrate the air feed regulator.

Reference being had to the various figures 10 designates the soldering point or tip which is socketed at its inner end to form a heating chamber 11. The wall of this socket is provided with a number of grooves or channels 12 that constitute a discharge for combustion products. A feed pipe 13 is inserted in the socket or chamber 11, being held in place by friction due to shrinking or a similar process, and is adapted to deliver a mixture of fuel and air to the chamber 11 for action, when ignited, on the soldering tip or point 10.

A casing 14, inclosing the mixing chamber 15, is threaded on the outer end of the feed tube 13, and has a baffle plate 16 formed thereon, to act as a shield from the heat radiating from the point or tip 10. The outer end of the casing is closed by a perforated partition 17, said partition being provided with an interiorly threaded concentric aperture 18 through which the fuel supply pipe 19 extends. This supply pipe 19 is threaded as at 20 for engagement with the threads of the aperture, whereby the said pipe may be adjusted with respect to the casing 14 and its projection into the chamber 15 thereof. At the inner end of the supply pipe 19 is a nozzle 21 through which the fuel is delivered to be mixed with the air and directed to the feed pipe 13.

Loosely mounted at the outer end of the casing 14 for coöperation with the perforated partition 17, is a closure plate 22, having the perforations 23 for registration with the perforations 24 of said partition. An ear 25 is formed from the closure plate 22 and constitutes a means whereby the plate may be oscillated to register the perforations 23 and 24 or to break such registration, thereby increasing or decreasing the supply of air to the mixing chamber 15. In order to limit the oscillatory movement of this plate 22 a headed pin 26 is secured in the partition 17 and projects through an arcuate slot 27 formed in said plate.

A continuation 28 of the supply pipe 19 may be curved or straight and in either event is embraced by the handle 29. Connecting with this continuation 28 is a flexible tube 30 by means of which the fuel is delivered to the supply pipe 19.

In operation the passage of the fuel from the nozzle 21 draws air into the mixing chamber 15 through the registering perforations 23 and 24, and to decrease the air in the mixture the registration of these perforations may be broken to any desired degree, by the oscillation of the plate 22. By rotating the pipe 19 the position of the nozzle 21 thereof with respect to the feed pipe 13 will be adjusted by means of the coöperation between the threads 20 and the threaded aperture 18.

What is claimed is:

In a device of the class described, a soldering tip having a socket at its inner end forming a heating chamber, the walls of said chamber being grooved to provide discharge openings for the products of combustion, a feed pipe having one end fitted in the socket and the opposite end screw-threaded, a casing screwed upon said screw-threaded end and having a peripherally flanged heat shield and an interior mixing chamber, a perforated partition at one end of said chamber having a central aperture, and a series of air inlets, a fuel supply pipe extending through the central aperture and a perforated oscillatory plate controlling the air inlets.

In testimony whereof I have hereunto affixed my name in the presence of two witnesses.

JOHN SWIERGOCKI.

Witnesses:
ROBT. KLOTZ,
VIOLA HARTMAN.